United States Patent
Gau

(10) Patent No.: US 9,024,905 B2
(45) Date of Patent: May 5, 2015

(54) TOUCH APPARATUS AND TOUCH METHOD USING THE SAME

(71) Applicant: Quanta Computer Inc., Tao Yuan Shien (TW)

(72) Inventor: Hsing-Chao Gau, Taoyuan County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 134 days.

(21) Appl. No.: 13/955,318

(22) Filed: Jul. 31, 2013

(65) Prior Publication Data
US 2014/0361998 A1    Dec. 11, 2014

(30) Foreign Application Priority Data
Jun. 11, 2013    (TW) .............................. 102120769 A

(51) Int. Cl.
*G06F 3/041*    (2006.01)

(52) U.S. Cl.
CPC ..................................... *G06F 3/041* (2013.01)

(58) Field of Classification Search
None
See application file for complete search history.

(56) References Cited

U.S. PATENT DOCUMENTS
2013/0050144 A1*  2/2013  Reynolds ...................... 345/174

* cited by examiner

*Primary Examiner* — Charles V Hicks
(74) *Attorney, Agent, or Firm* — Rabin & Berdo, P.C.

(57) ABSTRACT

A touch apparatus and touch method using the same. The apparatus includes: driving lines, sensing lines, a driving module, a sensing module, a determination module, and a detection module. The sensing lines are intersected with the driving lines to form intersection points. The driving module outputs pulse signals to the driving lines. The pulse signal includes at least three sub-periods in a period. The pulse signal has a sub-pulse signal in each of the sub-periods, and the sub-pulse signals respectively correspond to different phases. The sensing module receives the pulse signals from the sensing lines via the intersection points, and generates digital values corresponding to the sub-pulse signals of each pulse signal. The determination module determines whether the sub-pulse signals are interfered by noise according to the digital values. The detection module determines the position at which the touch event is triggered according to the sensing signals.

8 Claims, 7 Drawing Sheets

TOUCH APPARATUS AND TOUCH METHOD USING THE SAME

This application claims the benefit of Taiwan application Serial No. 102120769, filed Jun. 11, 2013, the subject matter of which is incorporated herein by reference.

BACKGROUND OF THE INVENTION

1. Field of the Invention

The invention relates in general to a touch apparatus and a touch method using the same, and more particularly to a touch apparatus with reduced noise interference and a touch method using the same.

2. Description of the Related Art

As the research and development of science and technology progress, information device products such as smart phones, tablet computers, and personal digital assistants are readily available and can be seen with people everywhere. In order for the portable information device products to provide more user-friendly user interface, it is a trend to employ touch control instead of traditional keyboard control.

The touch control technology now can be divided into several main categories: such as resistant, capacitive, optical types. The capacitive touch control conventionally determines whether a human touch occurs according to variation in capacitance. That is, when a user's finger is on a capacitive touch panel, a capacitance formed between electrode circuitry of the touch panel and the finger changes the equivalent capacitance of the electrode circuitry of the touch panel. The processor of the device can then detect the position at which the touch occurs according to the variation of the equivalent capacitance.

However, the conventional touch devices could be interfered easily by ambient noise and the touch devices would result in touch position misjudgment. Therefore, it is desirable for the industrial to provide a touch device with effective noise immunity.

SUMMARY OF THE INVENTION

The invention is directed to a touch apparatus with reduced noise interference and a touch method using the same.

According to an aspect of the invention, a touch apparatus is provided. The apparatus includes: driving lines, sensing lines, a driving module, a sensing module, a determination module, and a detection module. The sensing lines are intersected with the driving lines to form intersection points. The driving module outputs pulse signals to the driving lines. The pulse signal includes at least three sub-periods in a period. The pulse signal has a sub-pulse signal in each of the sub-periods, and the sub-pulse signals respectively correspond to different phases. The sensing module receives the pulse signals from the sensing lines via the intersection points, and generates digital values corresponding to the sub-pulse signals of each pulse signal. The determination module determines whether the sub-pulse signals are interfered by noise according to the digital values. The detection module determines the position at which the touch event is triggered according to the sensing signals.

According to another aspect of the invention, a touch control method for use in a touch apparatus is provided to detect a position for a touch event. In the touch apparatus, a plurality of driving lines and a plurality of sensing lines are included, wherein the driving lines and the sensing intersect to form a plurality of intersection points. The touch control method includes: outputting a plurality of pulse signals to the driving lines, wherein each of the pulse signals has at least three sub-periods in a period, and the pulse signal has a sub-pulse signal in each of the sub-periods, and the sub-pulse signals of the pulse signal respectively correspond to difference phases; receiving the pulse signals from the sensing lines via the intersection points and generating digital values corresponding to the sub-pulse signals of each of the pulse signals; determining whether the sub-pulse signals of each of the pulse signals are interfered by noise according to the digital values corresponding to the sub-pulse signals of each of the pulse signals, and generating a plurality of sensing signals according to the digital values corresponding to the sub-pulse signals of each of the pulse signals; and determining the position at which the touch event is triggered according to the sensing signals.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
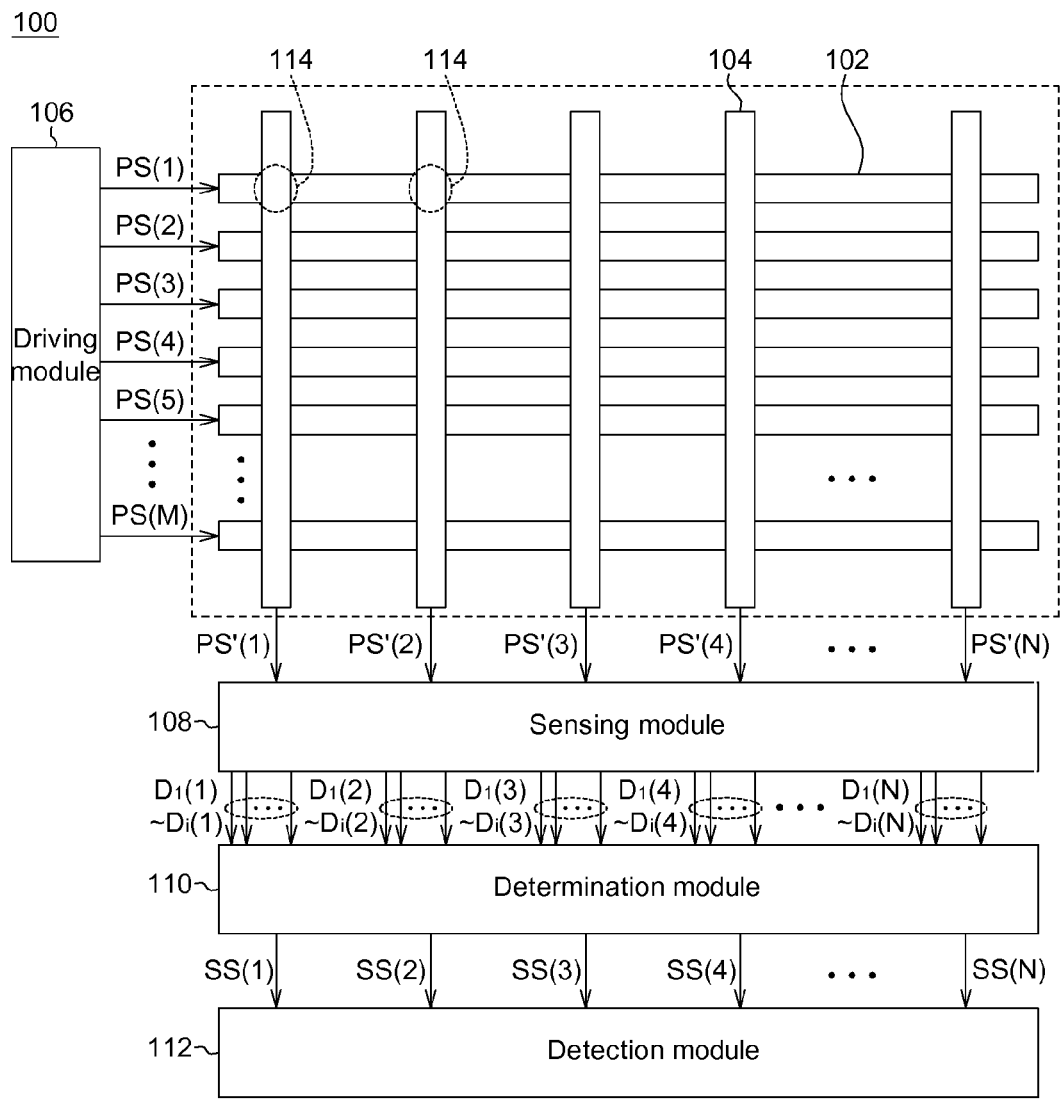
FIG. 1 is a block diagram illustrating a touch apparatus according to an embodiment of the invention.

Referring to FIG. 1, a touch apparatus 100 is illustrated according to an embodiment of the invention in a block diagram. The touch apparatus 100 detects a position at which a touch event is triggered. The touch apparatus 100 includes a plurality of driving lines 102, a plurality of sensing lines 104, a driving module 106, a sensing module 108, a determination module 110, and a detection module 112. The sensing lines 104 intersect with the driving lines 102 to form a plurality of intersection points 114. The driving module 106 outputs a plurality of pulse signals PS (e.g., PS(1) to PS(M)) to the driving lines 102. Each of the pulse signals PS has at least three sub-periods TS in a period T; Each of the pulse signal has a sub-pulse signal SPS in each of the sub-periods TS; and the sub-pulse signals SPS of each of the pulse signals PS respectively correspond to difference phases. The sensing module 108 receives the pulse signals PS' (e.g., PS'(1) to PS'(N)) from the sensing lines 104 via the intersection points 114, and generates a plurality of digital values D (e.g., $D_1(1)$ to $D_i(1)$, $D_1(2)$ to $D_i(2)$, $D_1(3)$ to $D_i(3)$, $D_1(4)$ to $D_i(4)$, . . . , $D_1(N)$ to $D_i(N)$) corresponding to the sub-pulse signals SPS' of each of the pulse signals PS' (e.g., PS'(1) to PS'(N)). The determination module 110 determines whether the sub-pulse signals SPS' of each of the pulse signals PS' are interfered by noise according to the digital values D corresponding to the sub-pulse signals SPS' of each of the pulse signals PS', and generates a plurality of sensing signals SS (e.g., SS(1) to SS(N)) according to the digital values D corresponding to the sub-pulse signals SPS' of each of the pulse signals PS'. The detection module 112 determines the position at which the touch event is triggered according to the sensing signals SS.

The applicant discovers that interference noise from the ambience or human body (e.g., differential mode noise transferred by and obtained from the power socket of the touch apparatus, or common mode noise conducted by the user's body) is usually a signal including specific frequencies. The touch apparatus 100 performs touch detection by outputting the sub-phase signals SPS with different phases. In this way, even the pulse signal PS is interfered by noise from the ambience or human body, the noise may intensively interfere only one of the sub-phase signals SPS of the pulse signal PS, rather than the entire pulse signal PS to be interfered intensively by noise.

In this embodiment, the sensing lines 104 are substantially perpendicular to the driving lines 102. The sensing lines 104 and the driving lines 102, for example, are electrodes on an upper layer and a lower layer respectively, perpendicularly arranged in columns and rows. The intersection points 114 are positions where the electrodes of the upper layer and the lower layer perpendicularly arranged in columns and rows intersect. At the intersection points 114, the upper and lower electrodes for the sensing lines 104 and the driving lines 102 form capacitances. The sensing module 108 receives the pulse signals PS' from the sensing lines 104 through the intersection points 114, and generates the digital value D corresponding to each sub-pulse signal SPS' of the pulse signal PS'. The determination module 110 generates a sensing signal SS according to the digital values D. In a practical example, the sensing signal SS corresponds to an equivalent capacitance for the intersection points 114. It is understood that the pulse signal PS' from the sensing line 104 received by the sensing module 108 may be affected by the RC delay generated by the equivalent capacitance and the resistance of the transmission lines.

Figure 2:
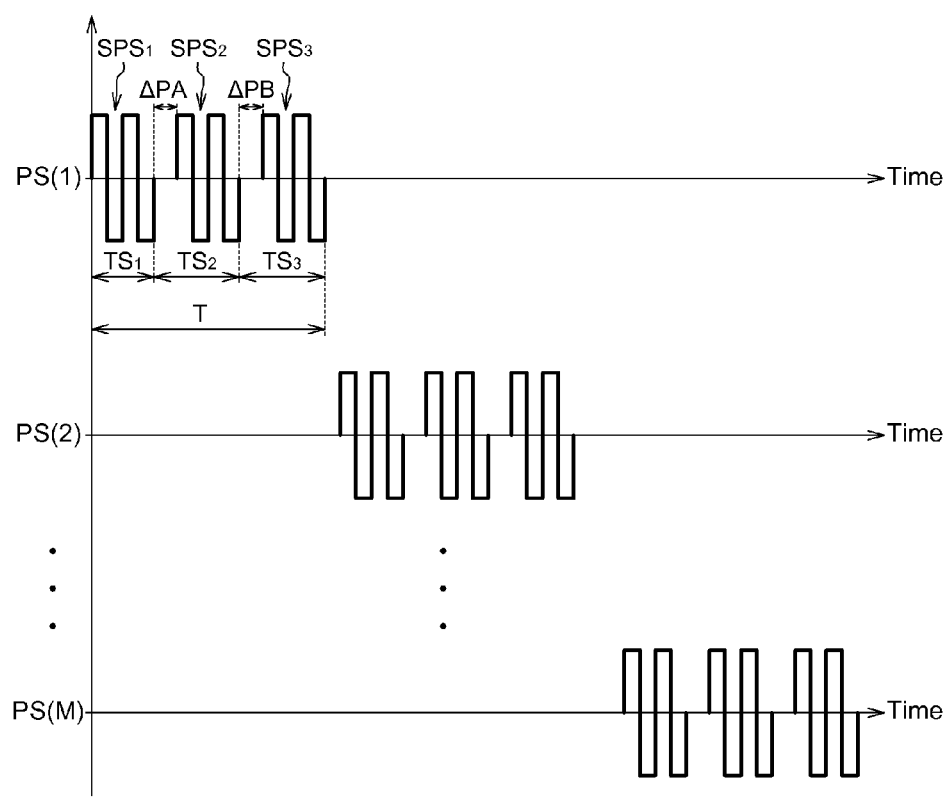
FIG. 2 is a timing diagram illustrating pulse signals outputted to driving lines according to an embodiment.

Referring to FIG. 2, a timing diagram illustrates pulse signals outputted to driving lines according to an embodiment. Pulse signals PS(1) to PS(M) represent the pulse signals PS outputted to the first to Mth lines of the sensing lines 102 by the driving module 106, wherein M is a positive integer. For instance, the pulse signal PS which the driving module 106 outputs to the first driving line 102 is indicated by the pulse signal PS(1), and the pulse signal PS which the driving module 106 outputs to the second driving line 102 is indicated by the pulse signal PS(2), and so on. As shown in FIG. 2, the pulse signals PS are sequentially outputted by the driving module 106 from the first driving line; the pulse signal PS in a period T has 3 sub-periods, i.e., $TS_1$, $TS_2$, and $TS_3$; and the pulse signal PS has sub-pulse signals $SPS_1$, $SPS_2$, and $SPS_3$ in the sub-periods $TS_1$, $TS_2$, and $TS_3$, respectively. In this embodiment, the frequencies of the sub-pulse signals $SPS_1$, $SPS_2$, and $SPS_3$ are substantially identical, but the phases of the sub-pulse signals $SPS_1$, $SPS_2$, and $SPS_3$ are different. As an instance in FIG. 2, the sub-pulse signal $SPS_2$ lags the sub-pulse signal $SPS_1$ by a phase of $\Delta PA$, and the sub-pulse signal $SPS_3$ lags the sub-pulse signal $SPS_2$ by a phase of $\Delta PB$. While the driving module 106 can output the pulse signals PS to the driving lines 102 in different ways and any implementation that the sub-pulse signals each correspond to different phases can be employed, it is to be understood that the invention is not limited thereto.

Figure 3:
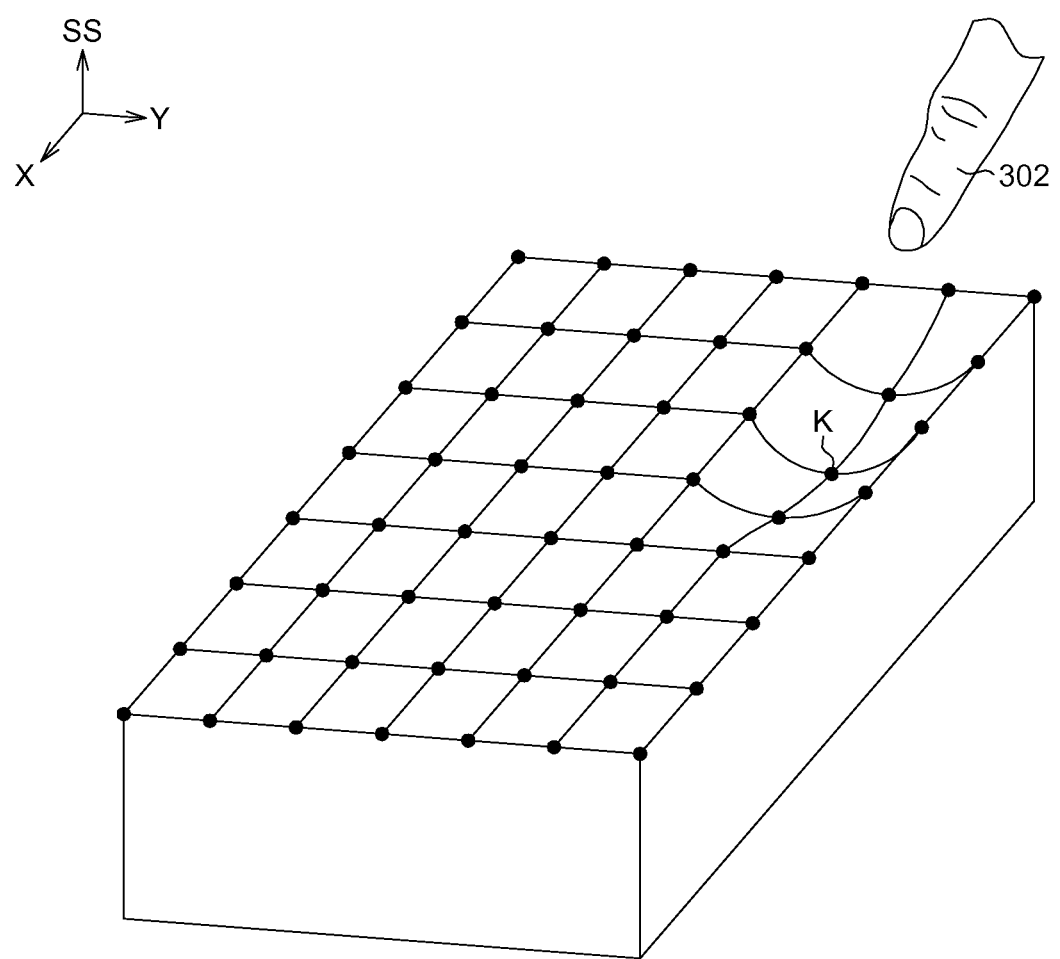
FIG. 3 is a schematic diagram illustrating the variation in sensing signals at intersection points when an object is near a touch plane of the touch apparatus.

Referring to FIG. 3, a schematic diagram illustrates the variation in sensing signals at the intersection points when an object (e.g., a user's finger) is near a touch plane (e.g., a XY plane in the Figure) of the touch apparatus. As illustrated in FIG. 3, the magnitude of the sensing signals SS corresponding to a neighborhood of the position (e.g., a position K) of the touch plane at which the object 302 is near is lower than that of the other positions. This occurs when the object is near the touch plane, the equivalent capacitances of the intersection points 114 near the object 302 change (i.e., for these intersection points 114 near the object 302, the object 302 is similar to a grounded capacitor), and then the equivalent capacitance corresponding to these intersection points 114 changes. Accordingly, the magnitude of the sensing signals SS corresponding to the intersection points 114 generated by the determination module 110 changes as shown in FIG. 3. In an example, the determination module 110 generates the sensing signals SS by an addition of the digital values D of the sub-pulse signals SPS' of the pulse signals PS'. For instance, it is supposed that pulse signals PS'(1) and PS'(2) respectively have sub-pulse signals $SPS_1'(1)$ to $SPS_i'(1)$ and $SPS_1'(2)$ to $SPS_i'(2)$, where i is an integer greater than or equal to three. The determination module 110 can then generate a sensing signal SS(1) by adding digital values $D_1(1)$ to $D_i(1)$ corresponding to the sub-pulse signals $SPS_1'(1)$ to $SPS_i'(1)$ of the pulse signal PS'(1). The determination module 110 can also generate a sensing signal SS(2) by adding digital values $D_1(2)$ to $D_i(2)$ corresponding to the sub-pulse signals $SPS_1'(2)$ to $SPS_i'(2)$ of the pulse signal PS'(2). It can be understood that the sub-pulse signals $SPS_1'(1)$ to $SPS_i'(1)$ of the pulse signal PS'(1) correspond to the sub-pulse signals $SPS_1(1)$ to $SPS_i(1)$ of the pulse signal PS(1) outputted by the driving module 106, and the sub-pulse signals $SPS_1'(2)$ to $SPS_i'(2)$ of the pulse signal PS'(2) correspond to the sub-pulse signals $SPS_1(2)$ to $SPS_i(2)$ of the pulse signal PS(2) outputted by the driving module 106, and so on.

After receiving the sensing signals SS generated by the determination module 110, the detection module 112 can determine the position of the touch plane where the object 302 touches according to the magnitude of the sensing signals SS. As an example illustrated in FIG. 3, since the magnitude of the sensing signals in the neighborhood near the position K is lower than the other positions (e.g., resulting in a concavity, as illustrated), the detection module 112 can determine the position K as the position of the touch plane where the object 302 touches. In practical examples, the detection module 112 can be a processor or any electronic computing component capable of determining the position where a touch event is triggered, according to the magnitude of a sensing signal.

Figure 4A:
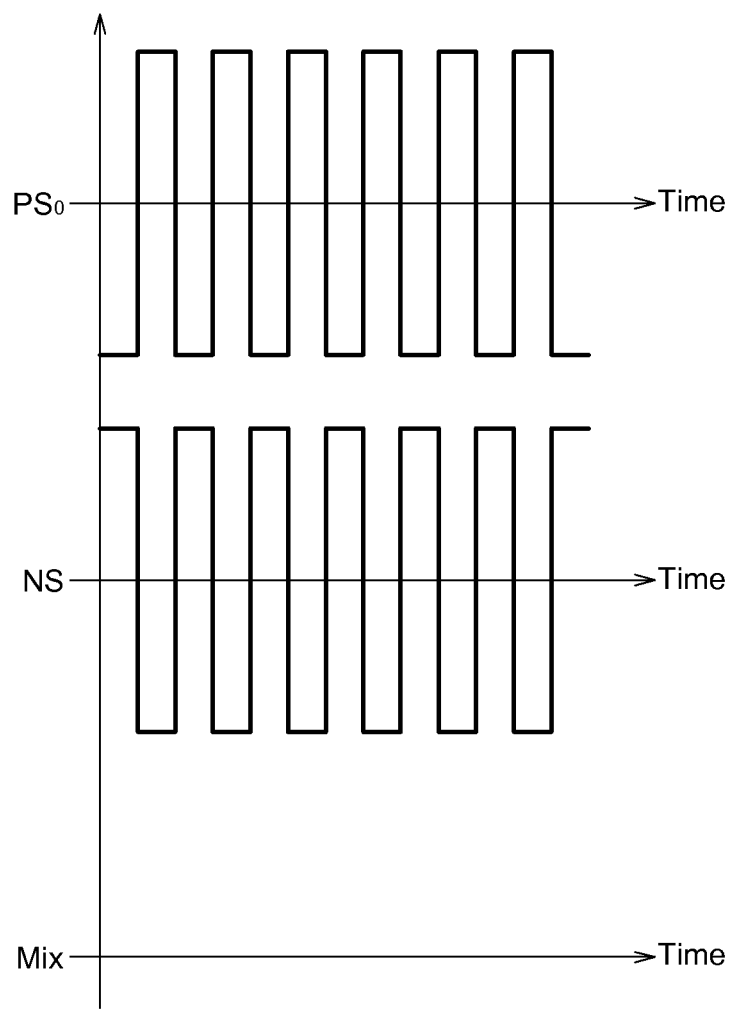
FIG. 4A is a schematic diagram showing an example of a pulse signal with a single phase and the interfered pulse signal.

For comparison with the embodiment, the following example of a pulse signal with only a single phase is taken. Referring to FIG. 4A, a schematic diagram is shown with an example of a pulse signal with only a single phase and the interfered pulse signal. In this example, a pulse signal $PS_0$ has only a single phase. When the phase difference between noise NS and the pulse signal $PS_0$ is 180° exactly (supposing that they have the same amplitude), the mixed pulse signal $PS_0$ by adding the noise NS and the pulse signal $PS_0$ results in the waveform as indicated by the signal $Mix_0$. Since the amplitude of the signal $Mix_0$ is very low, the touch apparatus in this situation would probably determine that a touch event occurs, leading to a misjudgment.

Figure 4B:
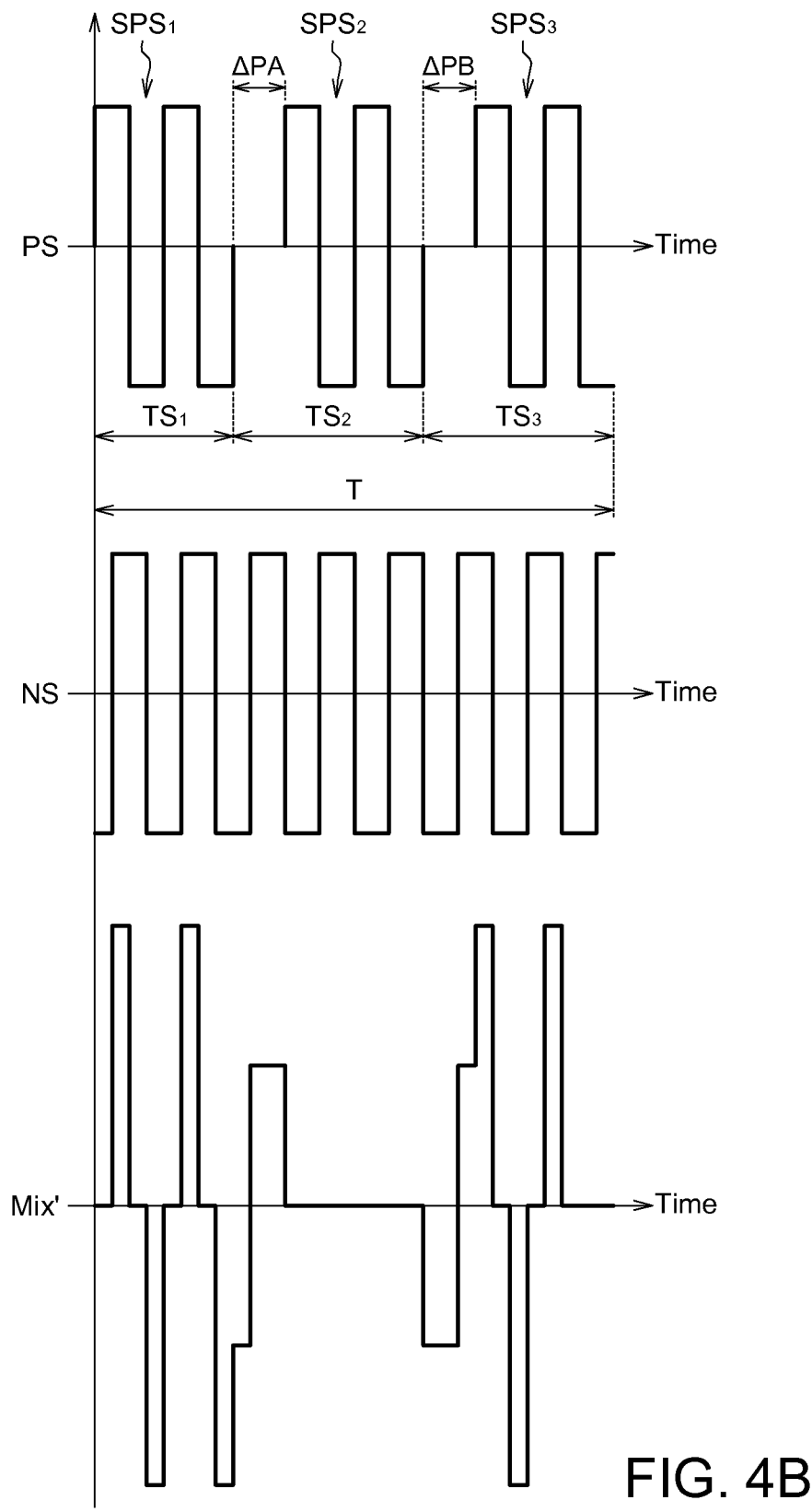
FIG. 4B is a schematic diagram showing a pulse signal and the interfered pulse signal according to an embodiment of the invention.

FIG. 4B is a schematic diagram showing a pulse signal and the interfered pulse signal according to an embodiment of the invention. The touch apparatus 100 of the embodiment can prevent a pulse signal PS from being canceled by noise by providing the pulse signal PS having at least three different sub-pulse signals SPS, so as to avoid a touch position misjudgment. It is supposed that the phase differences among the sub-pulse signals $SPS_1$, $SPS_2$, and $SPS_3$ of the pulse signal PS, respectively, are phase ΔPA and ΔPB (i.e., the sub-pulse signal $SPS_2$ lags the sub-pulse signal $SPS_1$ by a phase of ΔPA, and the sub-pulse signal $SPS_3$ lags the sub-pulse signal $SPS_2$ by a phase of ΔPB); in other words, the phases of the sub-pulse signals $SPS_1$, $SPS_2$, and $SPS_3$ of the pulse signal PS differ from one another. It is also supposed that the pulse signal PS is interfered by noise NS which differs from the sub-pulse signal $SPS_2$ of the pulse signal PS in phase by 180°, and then the mix of the pulse signal PS and the noise NS results in the signal Mix', as illustrated, with only the sub-pulse signal $SPS_2$ being canceled. Accordingly, the touch apparatus 100 of the embodiment can effectively avoid misjudgment due to noise interference since the pulse signal PS interfered by the noise NS would not be canceled entirely by the noise NS and would not produce a false touch event (e.g., the signal grounded due to a touch by a finger).

In other examples, a pulse signal PS may have more sub-pulse signals SPS (e.g., more than three sub-pulse signals SPS; the number of sub-pulse signals SPS is, preferably, an odd number not smaller than three); the phase differences among the sub-pulse signals may not be equal; but it is required that the phases of the sub-pulse signals SPS be different for one another.

Figure 5:
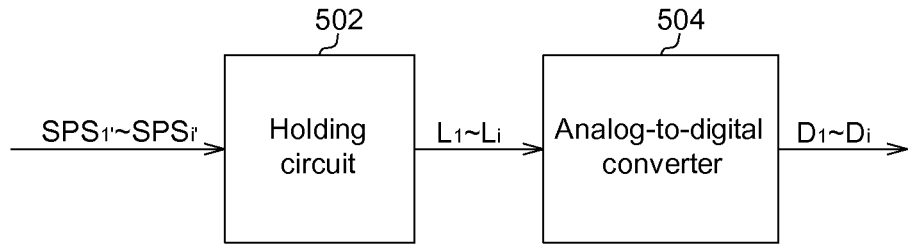
FIG. 5 is a block diagram of a sensing module according to an embodiment of the invention.

Referring to FIG. 5, a sensing module 108 is shown according to an embodiment of the invention in a block diagram. In this embodiment, a pulse signal PS' received from the sensing lines 104 by the sensing module 108 has a number of i sub-pulse signals SPS' (e.g., $SPS_1'$ to $SPS_i'$), where i is a positive integer greater than or equal to three. As shown in FIG. 5, the sensing module 108 includes a holding circuit 502 and an analog-to-digital converter 504. The holding circuit 502 is used for generating a plurality of level values L (e.g., $L_1$ to $L_i$) corresponding to integrals of the sub-pulse signals SPS' (e.g., $SPS_1'$ to $SPS_i'$) of the pulse signal PS' received from the sensing lines 104. For instance, the holding circuit 502 maintains a voltage level corresponding to an integral of each sub-pulse signal SPS' as a level value L corresponding to each sub-pulse signal SPS' of the pulse signal PS'. After the level value L of each sub-pulse signal SPS' is produced, the analog-to-digital converter 504 performs analog-to-digital conversion for the level values L to generate the digital values D (e.g., $D_1$ to $D_i$) corresponding to the sub-pulse signals SPS' of the pulse signal PS'. In an example, before the integral computation, the sub-pulse signal SPS' is converted into a positive pulse signal or a negative pulse signal.

After the digital values D corresponding to the sub-pulse signals SPS' are produced, the determination module 110 is operative to compare the digital values D corresponding to the sub-pulse signals SPS' of the pulse signal PS' and accordingly to determine whether the pulse signal PS' is interfered by noise. If the differences between the digital value D of one of the at least three sub-pulse signals SPS' of the pulse signal PS' and the digital values D of the other sub-pulse signals SPS' of the pulse signal PS' are all greater than a threshold value, it is determined that the pulse signal PS' is interfered by noise.

Taken the pulse signal PS'(1) received by the sensing module 108 from the sensing lines 104 as an example, it is supposed that the pulse signal PS'(1) has three sub-pulse signals $SPS_1'(1)$, $SPS_2'(1)$, and $SPS_3'(1)$ in a period, and $D_1(1)$, $D_2(1)$, and $D_3(1)$ correspond to the three sub-pulse signals $SPS_1'(1)$, $SPS_2'(1)$, and $SPS_3'(1)$, respectively. The determination module 110 can then compare the digital values $D_1(1)$, $D_2(1)$, and $D_3(1)$ to determine whether the pulse signal PS'(1) is interfered by noise. In addition, if the digital value (e.g., $D_2(1)$) corresponding to one (e.g., $SPS_2'(1)$) of the at least three sub-pulse signals SPS' of the pulse signal PS' (e.g., PS'(1)) received from the sensing lines 104 is far less than the digital values (e.g., $D_1(1)$, $D_3(1)$) of the other sub-pulse signals SPS' (e.g., $SPS_1'(1)$, $SPS_3'(1)$), it is determined that the sub-pulse signal SPS' (e.g., $SPS_2'(1)$) is canceled by the noise. Accordingly, the determination module 110 determines that the sub-pulse signal SPS' (e.g., $SPS_2'(1)$) of the pulse signal PS' (e.g., PS'(1)) is interfered by noise.

In an example, the determination module 110, by subtraction, can generate the differences among the digital values D for the sub-pulse signals SPS' of the pulse signal PS' received from the sensing lines 104, and make comparison of the differences with a threshold value. Taken the threshold value equal to three for instance, it is supposed that the digital values $D_1(1)$, $D_2(1)$, and $D_3(1)$ corresponding to the sub-pulse signals $SPS_1'(1)$, $SPS_2'(1)$, and $SPS_3'(1)$ of the pulse signal PS'(1) received from the sensing lines 104 are equal to 10, 11, and 9, respectively. Since the differences among the digital values $D_1(1)$, $D_2(1)$, and $D_3(1)$, i.e., $D_1(1)-D_2(1)$, $D_2(1)-D_3(1)$, and $D_3(1)-D_1(1)$, being equal to −1, 2, and −1, are all less than the threshold value (the absolute value of three), the determination module 110 then determines that the pulse signal PS'(1) has not been interfered by noise. Conversely, it is supposed that the digital values $D_1(1)$, $D_2(1)$, and $D_3(1)$ corresponding to the sub-pulse signals $SPS_1'(1)$, $SPS_2'(1)$, and $SPS_3'(1)$ of the pulse signal PS'(1) are equal to 10, 2, and 9, respectively. The differences among the digital values $D_1(1)$, $D_2(1)$, and $D_3(1)$, i.e., $D_1(1)-D_2(1)$, $D_2(1)-D_3(1)$, and $D_3(1)-D_1(1)$, are equal to 8, 7, and −1. That is, the differences between the digital value $D_2(1)$ corresponding to the sub-pulse signal $SPS_2'(1)$ and the other digital values $D_1(1)$ and $D_3(1)$ corresponding to the sub-pulse signals $SPS_1'(1)$ and $SPS_3'(1)$ are greater than the threshold value. Thus, the determination module 110 determines that the sub-pulse signal $SPS_2'(1)$ of the pulse signal PS'(1) is interfered by noise. While any implementation, in which whether the pulse signal is interfered by noise is determined according to the differences between the digital values corresponding to the sub-pulse signals of the pulse signal, can be employed in an embodiment of the determination module, it is to be understood that the invention is not limited to the above examples.

In an example, the determination module 110 includes a plurality of comparators each for comparing every two of the digital values D corresponding to the sub-pulse signals SPS' of the pulse signal PS' and accordingly determining whether the differences between the digital value D corresponding to one of the at least three sub-pulse signals SPS' of the pulse signal PS' and the digital values D corresponding to the other sub-pulse signals SPS' of the pulse signal PS' are all greater than the threshold value.

Figure 6:
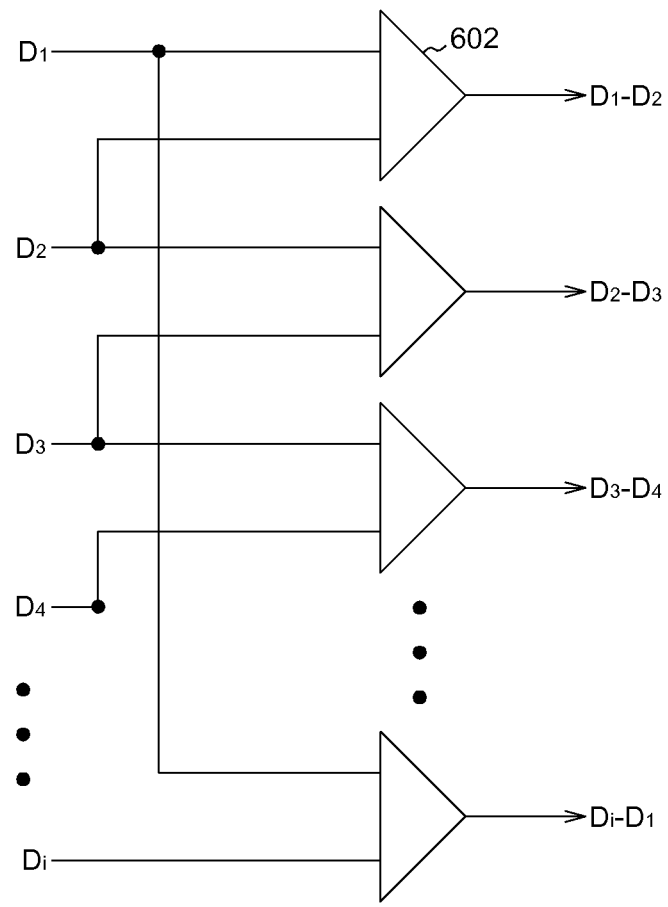
FIG. 6 is a schematic diagram illustrating a plurality of comparators of a determination module according to an embodiment of the invention.

FIG. 6 illustrates a plurality of comparators of a determination module according to an embodiment of the invention in a schematic diagram. In this embodiment, the determination module 110 includes a number of i comparators 602 (e.g., i is a positive integer greater than or equal to three) for comparing every two of i digital values D (e.g., $D_1$ to $D_i$) corresponding to i sub-pulse signals SPS' of the pulse signal PS'. For instance, each of the first to the (i−1)th comparators 602 compares the digital values D (e.g., $D_1$ and $D_2$; $D_3$ and $D_4$; and so on, as illustrated in FIG. 6) corresponding to two sub-pulse signals SPS', which are consecutive in time, during a period of the pulse signal PS'; and the ith comparator 602 compares the digital value (e.g., $D_1$ in FIG. 6) corresponding to the first sub-pulse signal SPS' with the digital value (e.g., $D_i$ in FIG. 6)

corresponding to the last sub-pulse signal SPS', during a period of the pulse signal PS'. In other examples, the differences between the digital values D corresponding to two arbitrary sub-pulse signals SPS' can be obtained by using the comparators 602.

As mentioned above, a sub-pulse signal SPS' is determined to be interfered by noise if the differences between the digital value corresponding to the sub-pulse signal SPS' and the other digital values D. In an embodiment, the determination module 110 further includes a compensation unit. The compensation unit is used for performing compensation on the digital value D corresponding to the sub-pulse signal SPS', which is interfered by noise, of the pulse signal PS', according to the digital values D corresponding to the sub-pulse signals, which are not interfered by noise, of the pulse signal PS', and generating a compensated sensing signal CSS according to the digital values D corresponding to the sub-pulse signals SPS' of the pulse signal PS' after the compensation.

Figure 7:
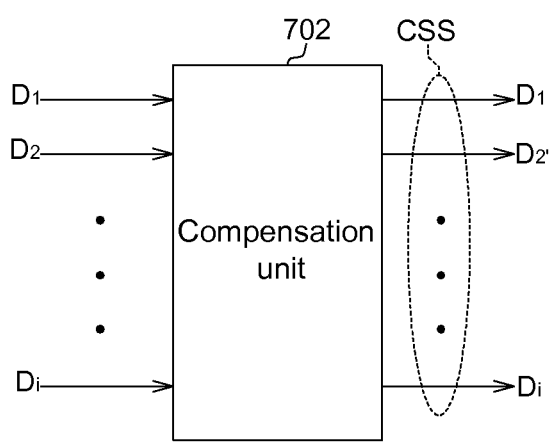
FIG. 7 is a schematic diagram illustrating a compensation unit according to an embodiment of the invention.

Referring to FIG. 7, a compensation unit is illustrated according to an embodiment of the invention in a schematic diagram. For the sake of explanation of the operation of the compensation unit, it is supposed that the digital value $D_2$ corresponding to the sub-pulse signal $SPS_2$' is interfered by noise; it is noted that the invention is not limited thereto. As shown in FIG. 7, the compensation unit 702 performs compensation on the digital value $D_2$ which is interfered by noise and thus to generate the compensated digital value $D_2$'. The compensation unit 702 generates the compensated sensing signal CSS using the digital values (e.g., the other digital values other than $D_2$) corresponding to the other sub-pulse signals SPS' which are not interfered by noise as well as the compensated digital value $D_2$', and outputs the compensated sensing signal CSS to the detection module 112. The compensated sensing signal CSS, for example, is the result of a summation of the compensated digital value $D_2$' and the digital values corresponding to the other sub-pulse signals SPS' which are not interfered by noise.

It is noted that the compensation unit of the embodiment can perform compensation on the digital value corresponding to the sub-pulse signal which is interfered by noise, generate the corresponding compensated sensing signal, and output the same to the detection module, in advance. Accordingly, the detection module, while determining a position of a touch event, can maintain its normal response rate, without increasing the computation amount for the back-end processing due to the noise interference (e.g., eliminating any touch point which is improper under normal touch paths by comparing the sensing results corresponding to the intersection points through software operations) and thus without reducing the response rate for the touch apparatus.

In an example, the compensation unit 702 is operative to replace the digital value corresponding to the sub-pulse signal SPS', which is interfered by noise, of the pulse signal PS' with an average value of the digital values corresponding to the sub-pulse signals SPS', which are not interfered by noise, of the pulse signal PS'. For instance in FIG. 7, the compensated digital value $D_2$' is equal to an average value of the digital values $D_1, D_3, D_4, \ldots, D_i$. While the compensation unit 702 can perform compensation in other manners, depending on different requirements for practical applications, it is to be understood that the invention is not limited thereto.

The invention further provides an embodiment of a touch control method for use in a touch apparatus, to detect a position for a touch event. The touch apparatus includes a plurality of driving lines and a plurality of sensing lines, wherein the driving lines and the sensing intersect to form a plurality of intersection points. The touch control method includes the following steps. First, a plurality of pulse signals are outputted to the driving lines, wherein each of the pulse signals has at least three sub-periods in a period, and the pulse signal has a sub-pulse signal in each of the sub-periods, and the sub-pulse signals of the pulse signal respectively correspond to difference phases. The pulse signals from the sensing lines are then received via the intersection points and digital values corresponding to the sub-pulse signals of each of the pulse signals are generated. Afterwards, a determination is made as to whether the sub-pulse signals of each of the pulse signals are interfered by noise according to the digital values corresponding to the sub-pulse signals of each of the pulse signals, and a plurality of sensing signals are generated according to the digital values corresponding to the sub-pulse signals of each of the pulse signals. The position at which the touch event is triggered is determined according to the sensing signals.

As mentioned above, the embodiments of the touch apparatus and the touch control method for the same provide a plurality of pulse signals including a plurality of sub-pulse signals with different phases, thus effectively avoiding touch position misjudgment due to the noise interference and enhancing its noise immunity.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch apparatus for detecting a position at which a touch event is triggered, the touch apparatus comprising:
   a plurality of driving lines;
   a plurality of sensing lines, which intersect with the driving lines to form a plurality of intersection points;
   a driving module for outputting a plurality of pulse signals to the driving lines, wherein each of the pulse signals has at least three sub-periods in a period, and the pulse signal has a sub-pulse signal in each of the sub-periods, and the sub-pulse signals of the pulse signal respectively correspond to difference phases;
   a sensing module for receiving the pulse signals from the sensing lines via the intersection points and generating digital values corresponding to the sub-pulse signals of each of the pulse signals;
   a determination module for determining whether the sub-pulse signals of each of the pulse signals are interfered by noise according to the digital values corresponding to the sub-pulse signals of each of the pulse signals, and for generating a plurality of sensing signals according to the digital values corresponding to the sub-pulse signals of each of the pulse signals; and
   a detection module for determining the position at which the touch event is triggered according to the sensing signals.

2. The touch apparatus according to claim 1, wherein the sensing lines are substantially perpendicular to the driving lines.

3. The touch apparatus according to claim 1, wherein frequencies of the sub-pulse signals are substantially identical.

4. The touch apparatus according to claim 1, wherein the sensing module comprises:

a holding circuit for generating a plurality of level values corresponding to integrals of the sub-pulse signals of each of the pulse signals received from the sensing lines; and an analog-to-digital converter for performing analog-to-digital conversion for the level values to generate the digital values corresponding to the sub-pulse signals of each of the pulse signals.

5. The touch apparatus according to claim 1, wherein the determination module is operative to compare the digital values corresponding to the sub-pulse signals of one pulse signal of the pulse signals and accordingly to determine whether the one pulse signal is interfered by noise;

wherein if differences between the digital value corresponding to one of the at least three sub-pulse signals of the one pulse signal and the digital values of the other sub-pulse signals of the one pulse signal are all greater than a threshold value, it is determined that the one pulse signal is interfered by noise.

6. The touch apparatus according to claim 5, wherein the determination module comprises:

a plurality of comparators each for comparing every two of the digital values corresponding to the sub-pulse signals of the one pulse signal and accordingly determining whether differences between the digital value corresponding to one of the at least three sub-pulse signals of the one pulse signal and the digital values corresponding to the other sub-pulse signals of the one pulse signal are all greater than a threshold value.

7. The touch apparatus according to claim 5, wherein the sub-pulse signal with its corresponding digital value which is greater than the other digital values by the threshold value is interfered by noise, and the determination module further comprises:

a compensation unit for performing compensation on the digital value corresponding to the sub-pulse signal, which is interfered by noise, of the one pulse signal, according to the digital values corresponding to the sub-pulse signals, which are not interfered by noise, of the one pulse signal, and generating a compensated sensing signal according to the digital values corresponding to the sub-pulse signals of the one pulse signal after the compensation.

8. The touch apparatus according to claim 7, wherein the compensation unit is operative to replace the digital value corresponding to the sub-pulse signal, which is interfered by noise, of the one pulse signal with an average value of the digital values corresponding to the sub-pulse signals, which are not interfered by noise, of the one pulse signal.

* * * * *